Feb. 9, 1943.　　　A. B. GIBSON　　　2,310,689
AUTOMATIC WEIGHING MACHINE
Filed Feb. 27, 1939　　　6 Sheets-Sheet 3

ANSEL B. GIBSON
INVENTOR

ATTORNEY

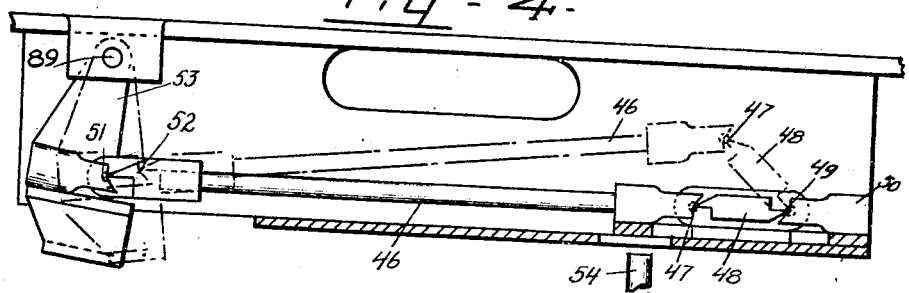
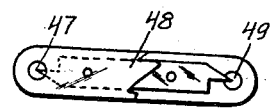
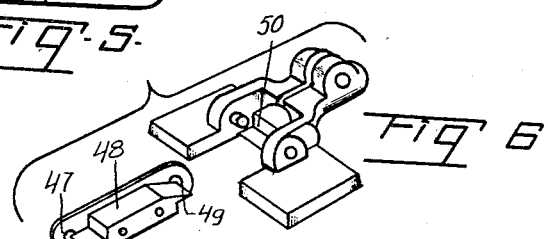
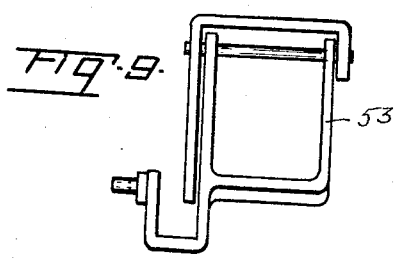
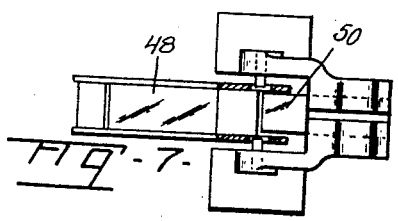
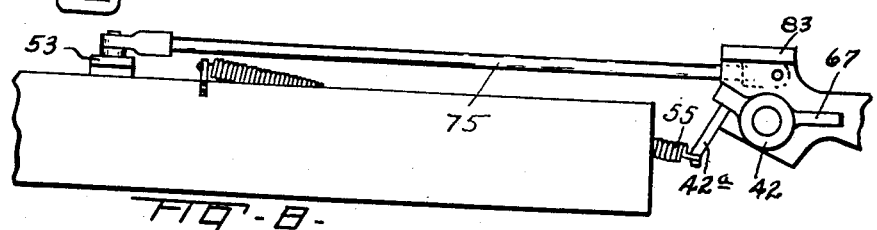

Feb. 9, 1943.  A. B. GIBSON  2,310,689
AUTOMATIC WEIGHING MACHINE
Filed Feb. 27, 1939  6 Sheets-Sheet 5
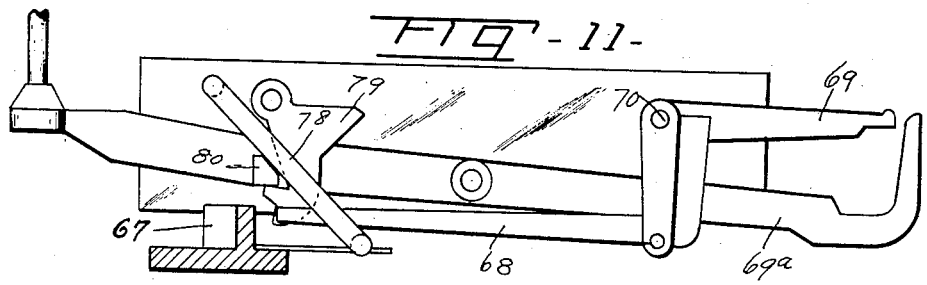
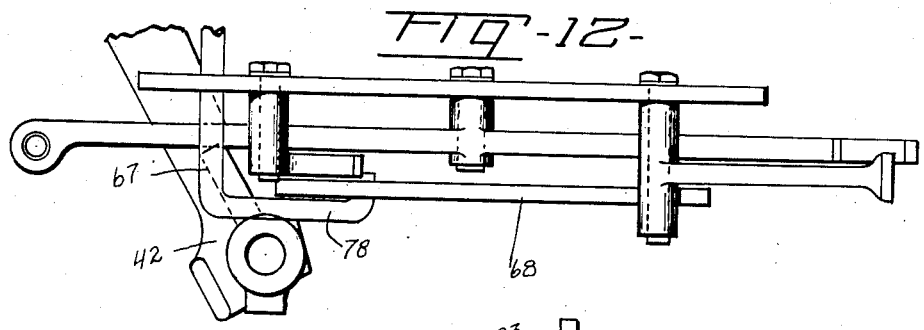
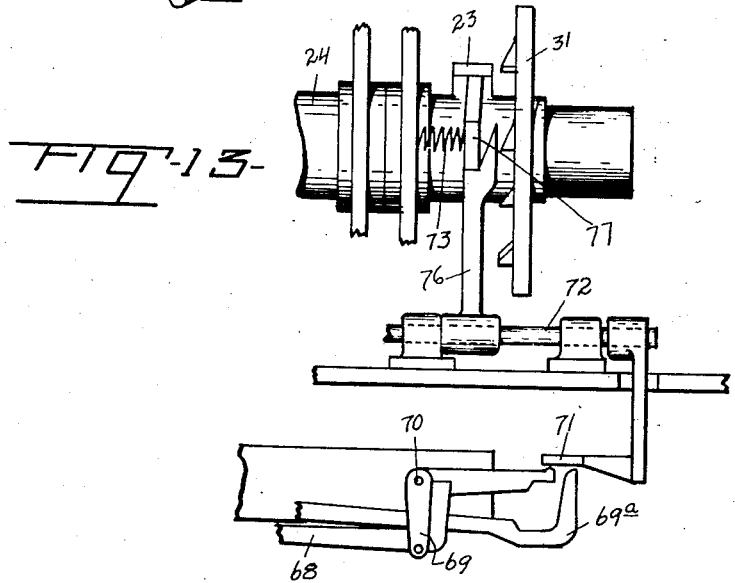
ANSEL B. GIBSON
INVENTOR
ATTORNEY

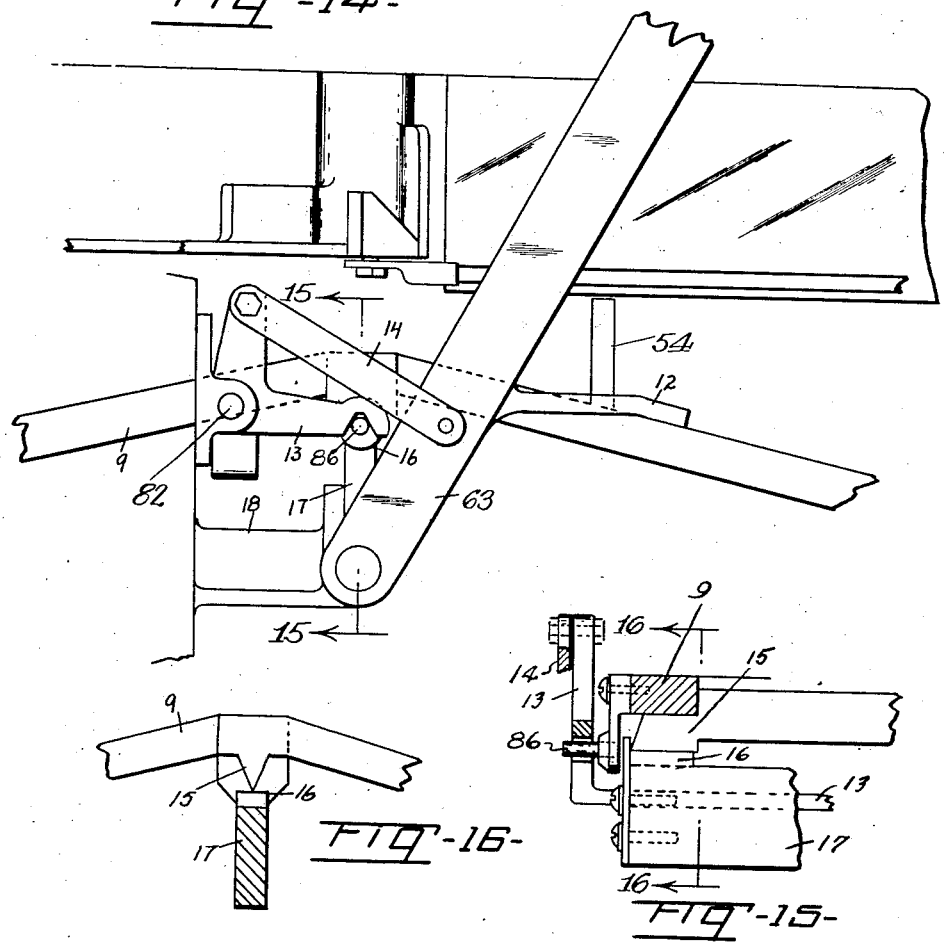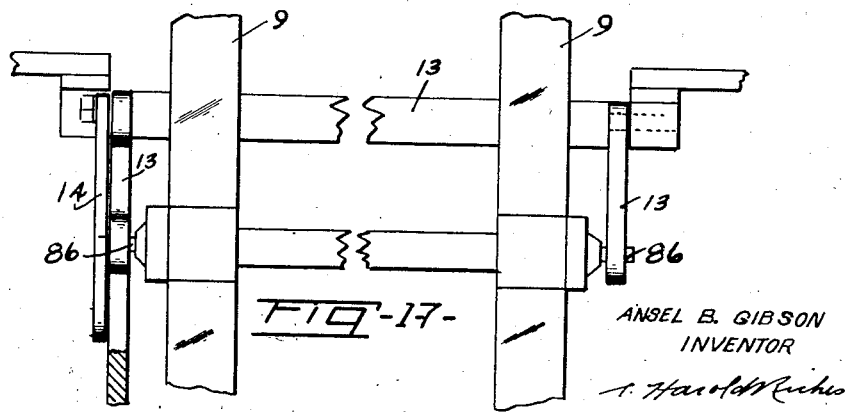

Patented Feb. 9, 1943

2,310,689

UNITED STATES PATENT OFFICE 2,310,689

AUTOMATIC WEIGHING MACHINE

Ansel B. Gibson, Toronto, Ontario, Canada

Application February 27, 1939, Serial No. 258,599

8 Claims. (Cl. 249—42)

This invention relates to improvements in automatic weighing machines and is particularly directed towards improvements in the automatic weighing mechanism by means of which each of the sequence of operations is positive and extremely rapid in its action and the resulting weighing operation is within a range of accuracy heretofore impossible to realize in automatic weighing machines.

In my United States Patent No. 1,990,068, I disclosed an automatic weighing machine having a weigh bucket connected with automatic weighing mechanism and adapted to receive the material to be weighed from a throat member interposed between the source of supply and the weigh bucket. A rotating valve member is movable longtiudinally in relation to the throat member to regulate the flow of material therethrough to the weigh bucket. Provision is made for automatically controlling the longitudinal positioning of the valve in relation to the throat member during each weighing operation by means of which the lowering of the valve member reduces the effective size of the throat to regulate the volume of material flowing therethrough. The sequential operation of the device is controlled electrically by the movement of the weigh beam and by a number of cams mounted on a cam shaft rotated by a single-revolution clutch which engages a rotating shaft, one complete revolution of the cam shaft effecting the sequential operations from the completion of each weighing operation to the beginning of following one.

While the principal features of the present invention are described in conjunction with the automatic weighing machine described and illustrated in the patent referred to hereinabove, it will be clearly understood that they are applicable to other types of automatic weighing machines without departing from the scope of the appended claims.

One of the principal features of the present invention resides in the novel assembly of parts by means of which all electrical contacts or part of them, if desired, are eliminated, and each of the sequence of operations is effected and controlled by a positive mechanical movement by means of which every possibility of error is substantially eliminated.

A further feature of my invention resides in the novel tripping arrangement by means of which the balancing of the weigh beam cuts off the flow of material into the weigh bucket and commences the sequence of movements preparatory to the following weighing.

A still further feature of the invention resides in the novel clamping and re-setting arrangement by means of which the weigh beam is held firmly between each weighing operation and the balance pivots are returned to their proper weighing position, if necessary, in which position the weighing beam is very delicately balanced on a knife edge resting on flat bearings to give the most accurate weighing results.

A still further feature resides in the automatic mechanism by means of which the single revolution clutch, which rotates the cam shaft on which the cams are mounted, engages the continuously rotating sprocket gear at the completion of each weighing operation and disengages at the beginning thereof.

The above and further features of the invention and the manner in which the objects of the invention are attained will be apparent from the following description and accompanying drawings, in which:

Figure 4 is a side elevation of the toggle tripping device shown in Figure 3;

Figure 5 is a side elevation of the double pivot link shown in Figure 3 and 4;

Figure 6 is a perspective view of the pivot bearing clamp shown in Figures 3 and 4;

Figure 7 is a top plan view of the pivoting link assembly;

Figure 8 is a top plan view of the connecting rod between the tripping device and the feed control valve;

Figure 9 is an end elevation of a lever shown in Figure 4 illustrating the connection between the tripping device and the control valve;

Figure 11 is a side elevation of the clutch control assembly;

Figure 12 is a top plan view of the clutch control assembly;

Figure 13 is a side elevation of the single-revolution clutch control;

Figure 14 is a side elevation of the weigh beam resetting and clamping assembly;

Figure 15 is an end view taken along the line 15—15, Figure 14;

Figure 16 is a side view taken along the line 16—16, Figure 15; and

Figure 17 is a top plan view of the weigh beam, clamping and re-setting assembly.

Like reference characters refer to like parts throughout the specification and drawings.

Figure 1:
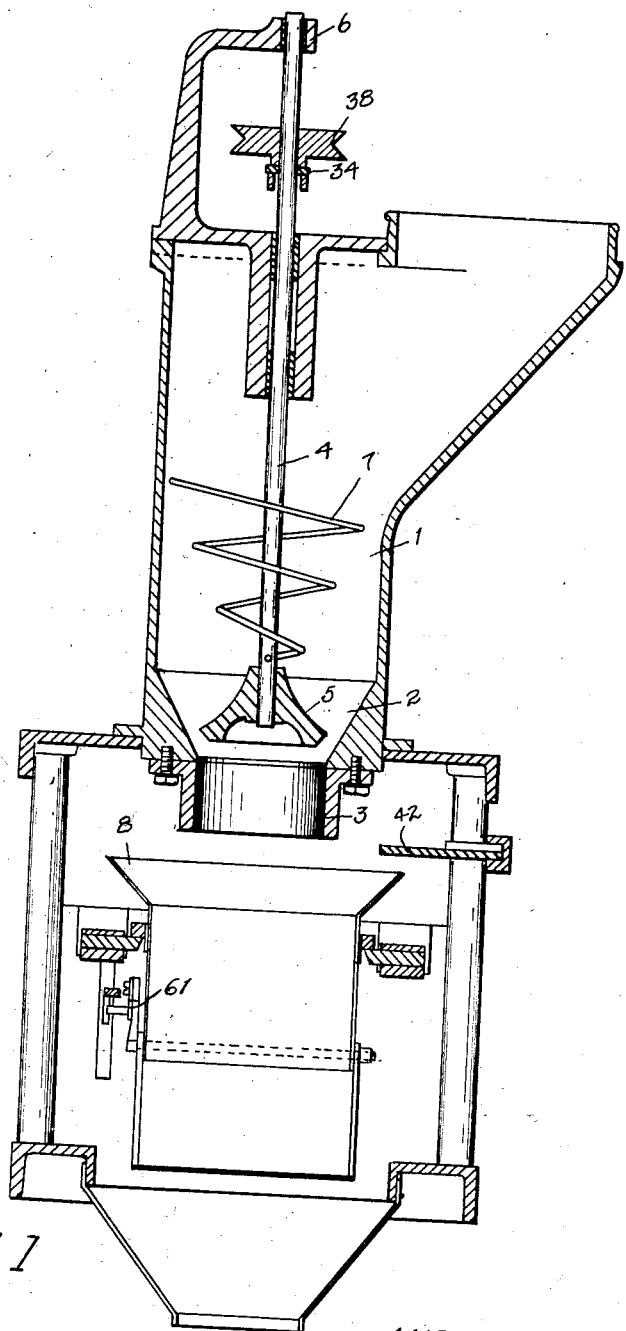
Figure 1 is a cross sectional front elevation of the material feeding mechanism and weigh bucket.

In the embodiment of my invention illustrated in the drawings, the material to be weighed is supplied to and contained in the conduit 1, which is preferably supported in a vertical position. The lower portion of the conduit 1 terminates in the throat member 2 which may form part of, or be otherwise secured to, the conduit 1. A constantly rotating shaft or spindle 4, journalled in bearings 6, extends vertically through conduit 1 and substantially in the centre of throat member 2 terminating in the rotating valve 5 inside the throat member 2. The spindle 4 is so designed as to be movable longitudinally so that in its highest position the valve 5 is clear of the throat member 2 allowing the free flow of material therethrough and as it is lowered the flow is gradually decreased until in its lowest position the valve, being of a diameter nearly as large as the smallest inside diameter of the throat member 2, reduces the flow to a predetermined minimum. The rotating valve member 5, therefore, serves the dual purpose of effectively controlling the rate of flow of material from conduit 1 through the throat member 2 and also acts as an agitator in moving material through the throat member 2 which otherwise might not flow by gravity. In handling material having a tendency to cake in or stick to the sides of conduit 1, I further provide an effective agitator 7 which may be secured to and wound spirally around the spindle 4 or valve 5.

The weigh bucket 8 is adapted to receive the material to be weighed and is located below conduit 1. The weigh bucket 8 is mounted at one end of weigh beam 9 while the other end of the weigh beam is adapted to receive the weights 10 in amounts according with the weight of material it is desired to place in the bucket before the weigh beam is swung on its pivot. I further provide a receiving chamber 3, formed in the lower part of conduit 1 immediately below the throat member 2 wherein a portion of the charge may be collected during the interval in which the closure member 42 is closed.

In accordance with the manner in which the automatic operation of the weighing machine is effected, as illustrated in the drawings, the weigh beam 9 is supported on the knife-edge pivot 15 engaging flat bearing blocks 16 carried at the ends of the transverse yoke member 17. The yoke member 17 is suitably secured to the flange 18. The flange 18 is secured to and projects outwardly from the vertical member 87 which is mounted on the base plate 88.

The weigh bucket 8 is pivotally mounted on the knife edge pivots 20 and is closed at the bottom by swinging door members 21 which are operated at the end of each weighing operation as will be explained hereinafter.

The opposite end of the weigh beam 9 receives the weights 10 and, during the interval between consecutive weighing operations and during the dropping of each bulk charge into the weigh bucket 8, is clamped against the adjustable stop member 22 by means of the clamping arm 12. At the same time, the knife edge pivot 15 is held firmly on the bearing surface 16, and, if necessary, its position on that bearing is re-set by the action of the V-shaped latch 13 which engages the pins 86 which project from the sides of the weigh beam 9 in alignment with the knife edge pivot. The pins 86 are designed to fit snugly into the V-shaped notches formed in member 13. The movement of the latch 13 is such that at its highest position the pins 86 are released from the V-shaped notches thereby permitting the free movement of the weigh beam while at its lowest point the pins are held firmly in the V-shaped notches, thereby holding the knife edge of the weigh beam firmly against its bearing surface and, if necessary, returns it to true alignment.

Figure 2:
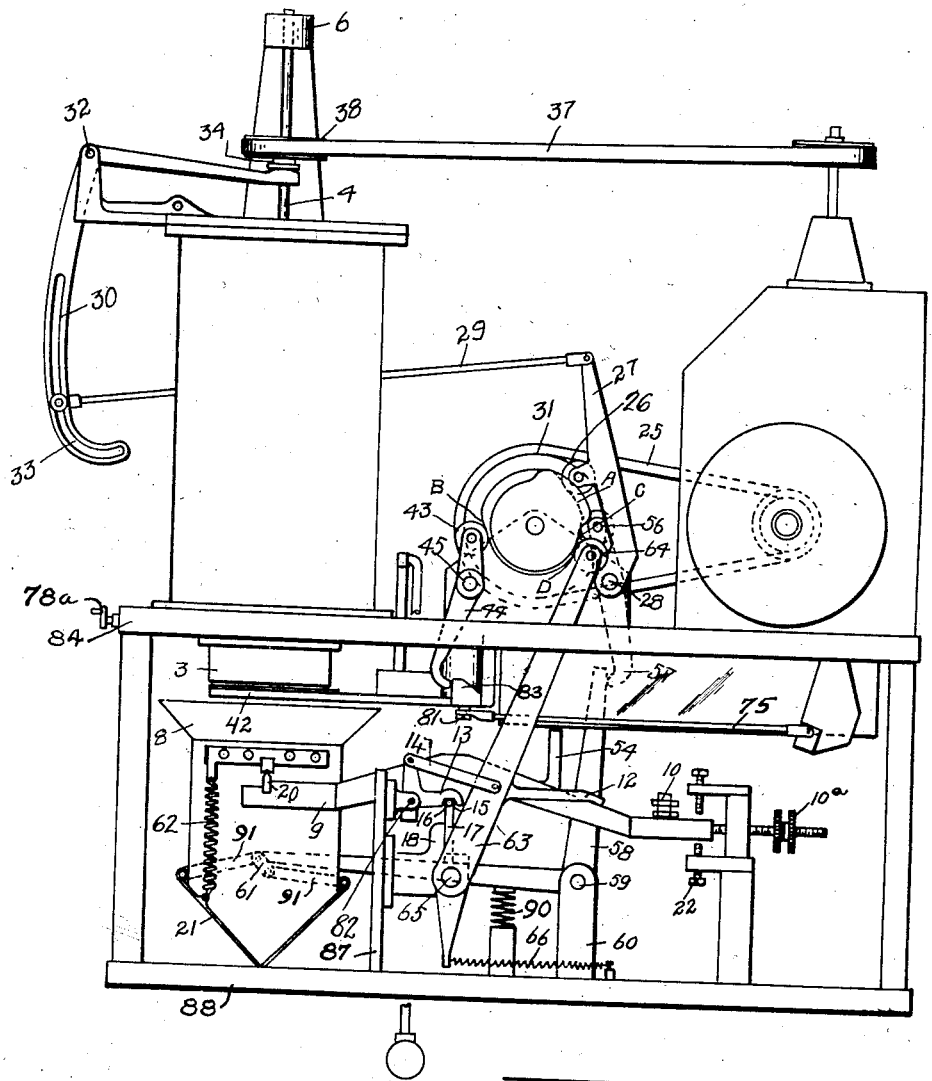
Figure 2 is a side elevation of the weighing and operating mechanism.
Figure 3:
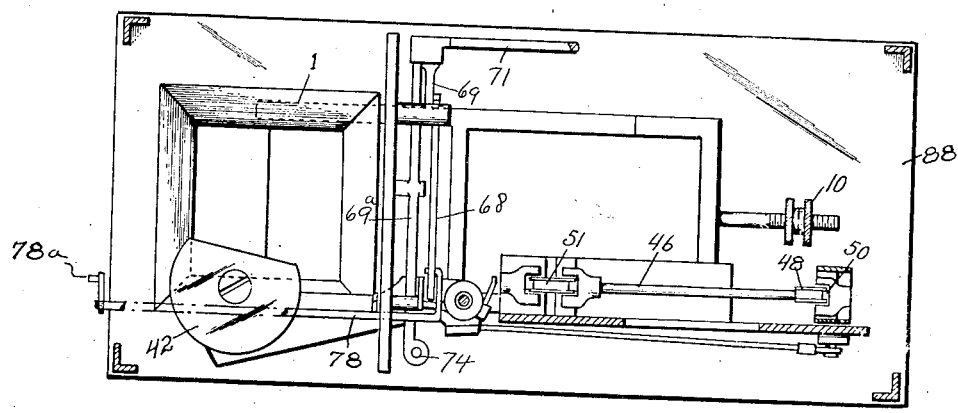
Figure 3 is a top plan view showing the toggle tripping device which forms one of the features of the invention.
Figure 10:
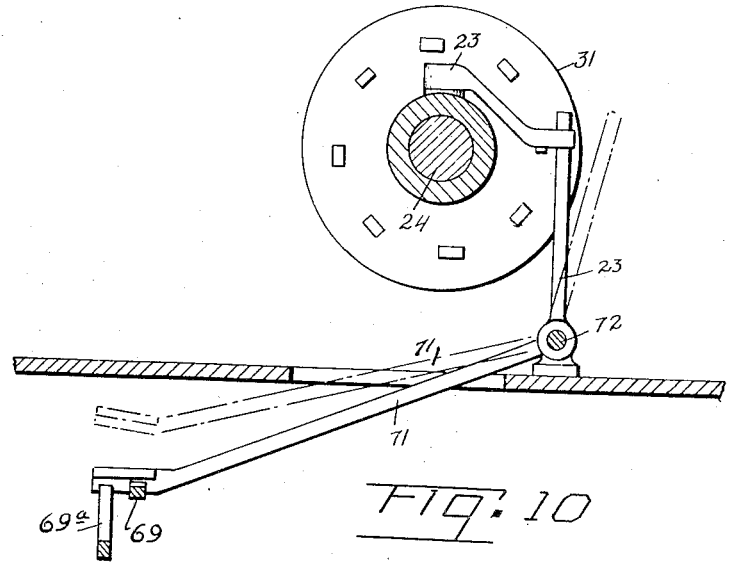
Figure 10 is an end elevation of the single-revolution clutch control assembly.

In the preferred modification illustrated in Figures 2 and 14, the latch 13 is pivotally secured at 82 and is actuated by the movement of link 14 which in turn is secured to, and actuated by, the movement of lever 63. The arm 12 is also secured to the lever 63.

While the apparatus used for operating the automatic feeding and weighing mechanism may be varied in several ways, I prefer to utilize a cam shaft 24 on which are mounted the cams A, B, C, and D. The cam shaft 24 is rotated by the single revolution clutch member 23 which engages the constantly rotating sprocket and clutch drive plate 31 which is driven by an electric motor or line shaft through belt or chain 25.

The lever 27, pivotally mounted at its lower end to a fixed member mounted on top plate 84 at the point 28, is provided with a cam follower 26 which is so located as to be engaged by cam A during its revolution. The lever 27 is joined at its upper end to one end of the connecting rod 29, the other end of which is adjustably connected to the bell crank lever 30 by means of a locking bolt and nut. The bell crank lever 30 is pivotally secured at 32 with its free arm engaging spindle 4, preferably under hub 34 of pulley 38 which is secured to spindle 4.

The cam A is so designed that at the start of each revolution of the cam shaft 24 the cam follower 26, riding on cam A, causes the linkage to raise spindle 4 to its highest position and then gradually lowers it, during the revolution, to its lowest position which is reached at the completion of the revolution. Both the highest and lowest positions are readily adjustable such as by provision of the slot 33 formed in the lower part of bell crank lever 30, in which slot the position of the end of connecting rod 29 is readily adjustably secured.

Continuous rotary motion is imparted to spindle 4, and agitator 7, from the motor or line shaft through belt 37 which engages pulley 38.

The closure member or valve 42 provided at the base of receiving chamber 3 is pivotally secured at 81 and the control of the movement thereof constitutes one of the features of the present invention, the operations resulting in its closing and opening being described in detail hereinafter.

As illustrated in Figure 2, the weighing mechanism is shown at rest in the extremely short interval between weighing operations. The valve 42 is shown in closed position. It is opened by the rotation of cam B which engages cam follower 43 provided at one end of lever 44. The lever 44 is pivotally secured approximately midway of its length to a fixed member mounted on top plate 84 at the point 45 and the free end engages the lug 83 provided on the end of the valve 42. The rotation of the cam causes the lever 44 to engage lug 83 thus turning the closure valve 42 to open position against the tension of spring 55, in which position it is held by the latching device until the weighing operation has been completed, as described in detail hereinafter.

The valve 42 is held open by the action of the latching device illustrated in Figures 3 to 9 inclusive and is closed instantaneously by the action of spring 55 on tripping the latch. One end of the tension spring 55 is secured to an arm 42ª which extends from the cut-off valve 42 and the other end is suitably secured to the frame, as illustrated in Figure 8. The tension of spring 55 tends to hold cut-off valve 42 in closed position. The principle involved in the latching device is that of a toggle link assembly in which friction has been reduced to a minimum by the use of knife edge pivots turning in bearing blocks. One end of the rod 46 is pivotally secured at 47 to the link 48. The link 48 is pivotally secured at 49 to the stationary bearing 50. Each end of the link 48 is provided with knife edges which move on the V-shaped bearing surfaces provided at 47 and 49 respectively. The other end of the rod 46 is pivotally secured at 51 to the lever 53, preferably by means of the knife edge 52. One end of lever 53 turns on a pin 89 secured to the frame of the device and at a point toward the other end is linked to valve 42 by means of a connecting rod 75.

Cut-off valve 42 is opened against the tension of spring 55 during the rotation of cam B which causes lever 44 to engage lug 83 with a stronger force than the opposing force of spring 55. Simultaneously, the toggle link assembly, comprising the rod 46, the link 48 and the stationary bearing 50, is set by connecting rod 75, in its straight-line position as shown in full lines in Figure 4.

During the continued rotation of cam B, the lever 44 is withdrawn from its engagement with lug 83. In its straight-line position, the toggle link assembly off-sets the tendency of tension spring 55 to return the cut-off valve 42 to its closed position.

During the interval the cut-off valve 42 is open, material flows from throat member 1 into weigh bucket 8. As the weight of the material in the weigh bucket approaches the predetermined weight, the weigh beam 9 approaches a balanced position, in which position the finger 54, which is carried on weigh beam 9, contacts and presses upwardly the rod 46, preferably at a point approximate to the pivoted connection with link 48. The compression strain, which has been imposed on the toggle link assembly in its straight-line position by spring 55, causes the assembly to buckle, as shown in dotted lines, Figure 4, and by the same action the cut-off valve is returned to its closed position, thereby stopping the flow of material into the weigh bucket.

The length of finger 54 may be made adjustable in order to trip the toggle link assembly slightly before the exact weight of material has been received in the weigh bucket, thereby avoiding any overweight caused by the material which is in suspension during the brief interval between the balancing of the weigh beam and the closing of the cut-off valve. In this respect, the position of valve 5 in throat member 1 is ordinarily such that only a few grains of material are in suspension, only sufficient in fact, to ensure the full predetermined weight of material being received in the weigh bucket. The relative movement of the throat member and the toggle link assembly are readily correlated to effect this result.

At the completion of each weighing operation, the swinging doors 21 are opened to drop the load in the weigh bucket 8 into a suitable container. The opening of the doors 21 is effected by means of cam C which, during the rotation of the cam shaft, engages cam follower 56 which is mounted at one end of the lever 57. The free end of lever 57 is adapted to engage the free end of the bell crank lever 58 which is pivotally secured to the stub shaft or post 60 at 59 and held in its position engaging lever 57 by the action of compression spring 99. The other end of the bell crank lever 58 engages a pin at one end of the short link 61 connecting the lever arms 61 which operate doors 21. The doors 21 are normally held in closed position by means of spring 62.

It will be apparent that when the initial large flow of material, immediately following the opening of valve 42, drops into the weigh bucket 8, the force reaction of the weigh beam 9 is greatly in excess of the actual weight of the material dropped, and, therefore, would tend to raise the beam which would start the sequential operations closing the valve 42 which, in turn, would automatically prevent the flow of any more material into the weigh bucket. To overcome any bulk weight reaction on the weigh beam 9, I provide the clamping member 12 as described hereinbefore, operated by lever 63.

The cam follower 64, mounted at one end of lever 63, is engaged by cam D during its rotation. The lever 63 is pivotally secured at 65 to the bracket 18 and the cam follower is pressed against cam D by the spring 66 secured to the free end thereof. The rotation of cam D therefore, causes lever 63 to press the clamping member 12 against weigh beam 9 and, at the same time, lever 13 holds the knife edge pivot 15 firmly on the flat bearing surface 16, at the same time re-setting it in its proper alignment on that surface, if necessary.

The single revolution clutch 23 engages the constantly rotating drive plate or sprocket 31 at the completion of each weighing operation substantially as follows:

The valve 42 is closed by spring 55 when the toggle link assembly is tripped from its straight-line position. As it closes, a part, namely, flange 67, as shown in Figure 12, contacts and actuates finger 68. Finger 68 is secured to one end of bell crank lever 69, the other end of which operates lever 71. Bell crank lever 69 is pivotally secured at 70. Lever 71 is secured to rod or shaft 72 to which is also secured the single revolution clutch control finger 76.

The withdrawal movement of finger 76 permits spring 73 to push the clutch dog 77 into mesh with the rotating sprocket gear 31. The opening of the closure member 42 releases the pressure on lever 71 causing the finger 76 to return to a position in which it disengages dog 77 thereby stopping the rotation of the cams.

If, for any reason, it is desired to commence each weighing operation at the convenience of an operator rather than automatically as hereinbefore described, I provide the manually actuated trip 69a, the free end of which is conveniently located at 74. The trip 69a engages lever 71 thus replacing the automatic action of finger 68 through bell crank lever 69. The finger 68 is readily disengaged by lever 78 to prevent the automatic control hereinbefore described. The lever 78 is journalled in the frame of the machine and extends exteriorly thereof, terminating in the operating handle 78ª. The opposite end of lever 78 extends below the finger 68, as illustrated in Figure 12. When it is desired to have each weighing operation commence automatically with the completion of the preceding one, the end of lever 78 is held in a position in which it is clear of finger 68. When it is desired to commence each weighing operation manually, however, the handle 78a is rotated to raise the end of lever 78 to a position in which finger 68 is raised and the free end of bell crank lever 69 is held from contact with the lever 71. In this position, each weighing operation may be commenced manually by actuation of trip 69a.

In order to prevent inadvertently tripping the clutch assembly by the manual control, I provide the safety latch 79, which is pivotally mounted in such a manner that normally its weight holds the latch portion locked against pin 80 carried on lever 69a. The closing of valve 42 releases the latch by contacting flange 67 which in turn releases latch 79. On opening the valve, the pressure on flange 67 is released and the latch 79 returns to its normal position by gravity.

In the operation of my automatic weighing machine, the sequence of mechanical movements is commenced by the completion of each weighing operation and consists of a series of movements by means of which the next weighing operation is effected.

The first step, of course, is the closing of valve 42 by spring 55 on the tripping of the toggle link latching device. This causes the single revolution clutch dog 77 to mesh with the continuously rotating sprocket gear 31, thus starting the rotation of the cams.

The doors 21 are opened by the rotation of cam C thus dropping the weighed material into a suitable container. At the same time, the rotation of cam A raises spindle 4 and throat member 5 to permit the free flow of material into the receiving chamber 3.

The rotation of cam D is timed on closing doors 21, valve 42 is opened, at the same time clamping arm 12 holds weigh beam 9 against the force weight reaction of the dropping of the bulk weight into weigh bucket 8. Simultaneously with this movement latch member 13 engages pins 86 to hold the knife edge bearing 15 in place and, if necessary, re-sets it on its bearing surface. As stated before, the opening of the closure member 42 releases the single revolution clutch dog 77 from its engagement with the continuously rotating sprocket 31 and the weighing operation proceeds to completion.

I have found my automatic weighing mechanism to be extremely accurate and the sequence of operations can be conducted at a very high rate. For example, operating at a rate of 25 weighings per minute, I have found it to be accurate within 1/64 of an ounce in weighing one pound packages or an error of about one tenth of one per cent. It may be slowed down to any predetermined rate of weighing or, as set out above, the automatic trip assembly can be readily disengaged so that the mechanism is manually operated at the convenience of the operator.

It will be apparent, of course, that the present improvements in weighing scales may be applied to other types of automatic scales than that specifically illustrated herein without departing from the scope of the appended claims.

What I claim as new and desire to protect by Letters Patent of the United States is:

1. In automatic weighing machines and including a weigh beam, a cut-off valve adapted to stop the flow of material into a weigh bucket carried on one end of said weigh beam; latching means adapted to hold said cut-off valve open during each weighing operation; means actuated by balancing said weigh beam adapted to trip said latching means to permit the closing of said cut-off valve, and means actuated by the closing of said cut-off valve to commence the sequence of operations preparatory to each weighing operation which comprises a clutch engageable with a constantly rotating driving member, lever means for engaging said clutch by the closing of said cut-off valve, means for disengaging said clutch at the completion of a single revolution thereof, means for disengaging said lever means to permit the manual control of the engagement of said single revolution clutch of the driving member, and means for preventing the movement of said manual control until the closing of said cut-off valve is effected.

2. In an automatic weighing machine including a weigh beam balanced on a knife edged pivot supported on a bearing surface, a weigh bucket carried on one end of said weigh beam, a conduit communicating with a supply of material to be weighed and said weigh bucket, a cut-off valve for said conduit, spring means normally holding said cut-off valve in closed position, cam actuated lever means engaging and opening said cut-off valve against the resistance of said spring, a toggle link assembly connected to said cut-off valve whereby in straight-line position said cut-off valve is held in open position and in buckled position the spring is free to return the cut-off valve to closed position, means actuated by the opening of said cut-off valve for resetting said toggle link assembly in straight-line position, and means actuated by the balancing of said weigh beam for buckling said toggle link assembly.

3. In an automatic weighing machine including a weigh beam balanced on a knife edged pivot supported on a bearing surface, a weigh bucket carried on one end of said weigh beam, a conduit communicating with a supply of material to be weighed and said weigh bucket, a cut-off valve for said conduit, spring means normally holding said cut-off valve in closed position, cam actuated lever means engaging and opening said cut-off valve against the resistance of said spring, a toggle link assembly connected to said cut-off valve whereby in straight-line position said cut-off valve is held in open position and in buckled position the spring is free to return the cut-off valve to closed position, means actuated by the opening of said cut-off valve for resetting said toggle link assembly in straight-line position, and means actuated by the balancing of said weigh beam for buckling said toggle link assembly, pins extending transversely from opposite sides of said weigh beam, a latch member having V-shaped notches in alignment with and adapted to engage said pins, and means controlled by the movement of said cut-off valve for actuating said latching means.

4. In an automatic weighing machine including a weigh beam balanced on a knife edged pivot supported on a bearing surface, a weigh bucket carried on one end of said weigh beam, a conduit communicating with a supply of material to be weighed and said weigh bucket, a cut-off valve for said conduit, spring means normally holding said cut-off valve in closed position, cam actuated lever means engaging and opening said cut-off valve against the resistance of said spring, a toggle link assembly connected to said cut-off valve whereby in straight-line position said cut-off valve is held in open position and in buckled position the spring is free to return the cut-off valve to closed position, means actuated by the opening of said cut-off valve for resetting said toggle link assembly in straight-line position, and means actuated by the balancing of said weigh beam for buckling said toggle link assembly, pins extending transversely from opposite sides of said weigh beam in alignment with the aforesaid knife edge pivot, a latch member having V-shaped notches in alignment with and adapted to engage said pins and means controlled by the movement of said cut-off valve for actuating said latching means.

5. In an automatic weighing machine including a weigh beam balanced on a knife edged pivot supported on a bearing surface, a weigh bucket carried on one end of said weigh beam, a conduit communicating with a supply of material to be weighed and said weigh bucket, a cut-off valve for said conduit, spring means normally holding said cut-off valve in closed position, cam actuated lever means engaging and opening said cut-off valve against the resistance of said spring, a toggle link assembly connected to said cut-off valve whereby in straight-line position said cut-off valve is held in open position and in buckled position the spring is free to return the cut-off valve to its closed position, the links of said toggle link assembly being supported on knife edge pivots turning in V-shaped bearing surfaces, means actuated by the opening of said cut-off valve for resetting said toggle link assembly in straight-line position, and means actuated by the balancing of said weigh beam for buckling said toggle link assembly.

6. In an automatic weighing machine including a weigh beam, a weigh bucket carried on one end of said weigh beam, a conduit to feed material to be weighed into said weigh bucket, a cut-off valve for said conduit to control the flow of said material, spring means normally holding said cut-off valve in closed position, means for opening said cut-off valve comprising a cam actuated lever engaging and opening said valve against the resistance of said spring, a toggle having a link pivoted on knife edges movable on V-shaped bearing surfaces to hold said cut-off valve in open position, means co-operating with the balancing of said weigh beam to trip said toggle thereby permitting said spring to close said cut-off valve and means actuated by the opening of said cut-off valve for resetting said toggle.

7. In an automatic weighing machine including a weigh beam, a weigh bucket carried on one end of said weigh beam, a conduit to feed material to be weighed into said weigh bucket, a cut-off valve for said conduit to control the flow of said material, spring means normally holding said cut-off valve in closed position, means for opening said cut-off valve comprising a cam actuated lever engaging and opening said valve against the resistance of said spring, a toggle having a link pivoted on knife edges movable on V-shaped bearing surfaces to hold said cut-off valve in open position, means cooperating with the balancing of said weigh beam to trip said toggle thereby permitting said spring to close said cut-off valve, means actuated by the opening of said cut-off valve for resetting said toggle and means actuated by the closing of said cut-off valve for commencing each weighing operation.

8. In an automatic weighing machine including a weigh beam, a weigh bucket carried on one end of said beam, a conduit to feed material to be weighed into said weigh bucket, a cut-off valve for said conduit to control the flow of said material, spring means normally holding said cut-off valve in closed position, means for opening said cut-off valve comprising a cam actuated lever engaging and opening said valve against the resistance of said spring, a toggle having a link pivoted on knife edges movable on V-shaped bearing surfaces to hold said cut-off valve in open position, means cooperating with the balancing of said weigh beam to trip said toggle thereby permitting said spring to close said cut-off valve, means actuated by the opening of said cut-off valve for resetting said toggle, and means actuated by the closing of said cut-off valve comprising a clutch engageable with a constantly rotating driving element, lever means actuated by the closing of said cut-off valve to engage said clutch and means for disengaging said clutch at the completion of a single revolution thereof.

A. B. GIBSON.